United States Patent [19]

Gellert

[11] Patent Number: 5,705,202
[45] Date of Patent: Jan. 6, 1998

[54] FOUR HEATED NOZZLE MANIFOLDS INTERCONNECTED IN A COMMON PLANE

[76] Inventor: Jobst Ulrich Gellert, 7A Prince Street, Georgetown, Ontario, Canada, L7G 2X1

[21] Appl. No.: 692,706

[22] Filed: Aug. 6, 1996

[30] Foreign Application Priority Data

Jul. 5, 1996 [CA] Canada ................................. 2180602

[51] Int. Cl.$^6$ ................................................. B29C 45/22
[52] U.S. Cl. ................ 425/549; 264/297.8; 264/328.8; 264/328.14; 425/570; 425/572; 425/588
[58] Field of Search ........................... 425/547, 548, 425/549, 570, 571, 572, 581, 588; 264/328.8, 328.14, 297.8

[56] References Cited

U.S. PATENT DOCUMENTS

| | | |
|---|---|---|
| 4,219,323 | 8/1980 | Bright et al. . |
| 4,761,343 | 8/1988 | Gellert . |
| 5,227,179 | 7/1993 | Benenati ................................. 425/572 |
| 5,503,545 | 4/1996 | Benenati ................................. 425/572 |

*Primary Examiner*—Tim Heitbrink
*Attorney, Agent, or Firm*—Dalesman & Company

[57] ABSTRACT

Multi-cavity injection molding apparatus having four nozzle manifolds mounted in a common plane with a central inlet manifold having two arms extending in opposite directions. The central manifold has a longitudinal axis extending in a first direction through the two arms. Each nozzle manifold is offset from the central manifold in a second direction that is substantially perpendicular to the longitudinal axis. Each nozzle manifold has a locating pin to locate it in a second direction perpendicular to the first direction. The locating pin allows thermal expansion to slide the nozzle manifold in the first direction into a position wherein each branch of the melt passage is aligned with the melt bore through one of the nozzles extending from the nozzle manifold. A pair of the nozzle manifolds are connected on opposite sides of each arm of the central manifold by connector bushings. Each connector bushing is sufficiently slidable to absorb thermal expansion in the second direction which allows the locating pin to be used to locate each nozzle manifold in the second direction. Thus, the combination of the connector bushing and the locating pin allow sufficient movement of the nozzle manifold in both the first and second directions to provide for thermal expansion of the heated manifold relative to the cooled mold.

6 Claims, 4 Drawing Sheets

FOUR HEATED NOZZLE MANIFOLDS INTERCONNECTED IN A COMMON PLANE

BACKGROUND OF THE INVENTION

This invention relates generally to injection molding and more particularly to apparatus with provision to slidably locate four heated nozzle manifolds mounted in a cooled mold in the same plane as a central manifold from which they receive melt.

As is well known in the injection molding field, it is very desirable to be able to simultaneously inject a large number of cavities. In the past, this has been done by having the melt passage branch in a heated nozzle manifold to a number of different nozzles each leading to a different cavity. While there can be a problem of misalignment of the melt bores through the nozzles with the different branches of the melt passage in the nozzle manifold due to the greater heat expansion and contraction of the heated nozzle than the cooled mold in which the nozzles are seated, this problem typically arises only if the nozzle manifold is very large. It is known to increase the number of cavities and thus the mold size by interconnecting two or more nozzle manifolds. However, this increases the problem of thermal expansion and contraction. In the past, this problem has been dealt with by securely fixing the nozzles in position in the mold and allowing for the thermal expansion and contraction in the connection between the nozzle manifolds. One example of the prior art approach is seen in the applicant's U.S. Pat. No. 4,761,343 which issued Aug. 2, 1988 wherein a number of nozzle manifolds are interconnected by a bridging manifold spanning across the top of them. The allowance for thermal expansion and contraction is provided by allowing the bridging manifold to slide a little across the tops of the support manifolds to accommodate the thermal expansion and contraction. While this has the advantage of interconnecting a number of nozzle manifolds, it has the disadvantage that the bridging manifold must extend in a plane which is distinctly different than the plane of the nozzle manifolds, a situation which is not acceptable in some applications such as stack molding where minimum mold height is required. Another example of allowance for differences in thermal expansion and contraction is seen in U.S. Pat. No. 4,219,323 to Bright et al. which issued Aug. 26, 1980. In this case, two heated nozzle manifolds are interconnected by a connecting link in which expansion slots are cut crossways to allow for thermal expansion. While this has the advantage that the connecting link is in the same plane as the nozzle manifolds, in addition to being very imprecise it has the disadvantage that bushings are required inside the connecting link to prevent melt leakage through the expansion slots.

SUMMARY OF THE INVENTION

Accordingly, it is an object of the present invention to at least partially overcome the disadvantages of the prior art by providing injection molding apparatus with provision to slidably locate four heated nozzle manifolds mounted in a cooled mold in the same plane as a central manifold from which they receive melt.

To this end, in one of its aspects, the invention provides injection molding apparatus with a heated central manifold and a plurality of heated nozzle manifolds mounted in a mold. The apparatus also has a melt passage branching in the central manifold for conveying melt from a central inlet in the central manifold through the nozzle manifolds to a plurality of heated nozzles extending from each nozzle manifold. Each nozzle is seated in the mold with a central melt bore extending in alignment with a gate leading to a cavity in the mold. Each nozzle manifold is made and mounted so that thermal expansion slides the branches of the melt passage into alignment with the melt bores through the nozzles when the manifolds are heated to the operating temperature.

Particular benefits of the improvement of this invention arise wherein the central manifold and four nozzle manifolds extend in a common plane. The central manifold is centrally located relative to the four nozzle manifolds and has two elongated arms extending in substantially opposite directions along a longitudinal axis. Each arm has two opposed sides and a pair of nozzle manifolds are mounted on opposite sides of each arm of the central manifold, whereby each nozzle manifold is offset from the central manifold in a second direction that is substantially perpendicular to the longitudinal axis of the central manifold. An elongated connector bushing extends outward from each side of each arm of the central manifold to slidably connect one of the nozzle manifolds to the central manifold. A slidable locating device extends between the mold and each nozzle manifold. The melt passage of the manifold system branches in opposite directions in each arm of the central manifold to extend through each of the connector bushings and, thereafter, to each of the plurality of heated nozzle manifolds. The melt passage branches again in each nozzle manifold to extend to the melt bore through each of the nozzles.

The connector bushing locates the nozzle manifold relative to the central manifold in a first direction which is essentially parallel to the longitudinal axis while allowing movement to compensate for thermal expansion and contraction of the nozzle manifold and the central manifold in the second direction substantially perpendicular to the first direction. The slidable locating device locates each nozzle manifold at a position relative to the mold in the second direction while allowing movement of the nozzle manifold relative to the mold in the first direction. The combination of the connector bushing and the slidable locating device allows sufficient movement in both the first and second directions to provide for thermal expansion and contraction of the heated manifolds relative to the cooled mold. Each nozzle manifold is made and mounted so thermal expansion within the central manifold, connector bushings and nozzle manifolds slides the branches of the melt passage into alignment with the melt bores through the nozzles when the manifolds and connector bushings are heated to the operating temperature.

Further objects and advantages of the invention will appear from the following description taken together with the accompanying drawings.

DETAILED DESCRIPTION OF THE INVENTION

Figure 1:
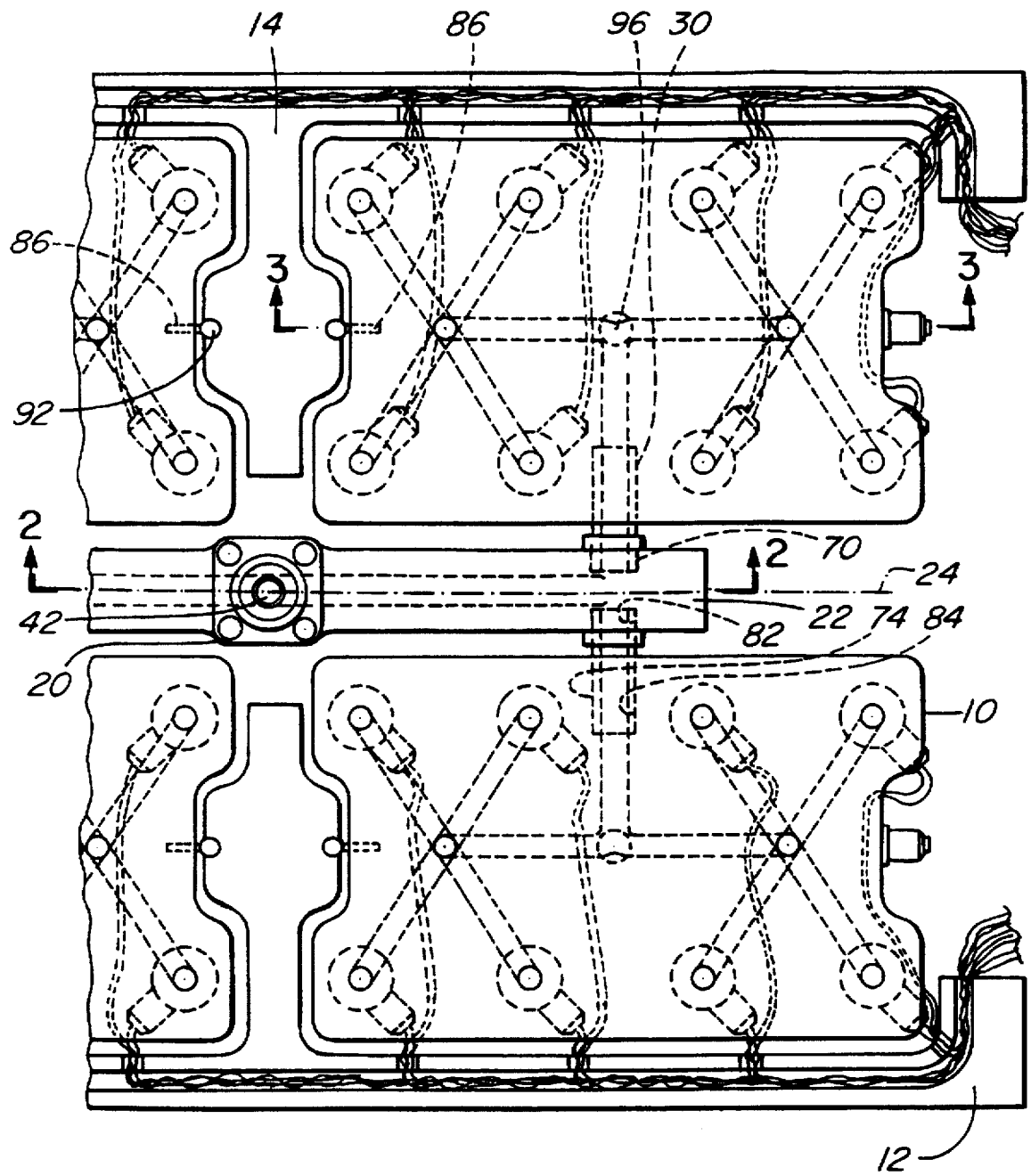
FIG. 1 is a plan view showing four heated nozzle manifolds seated in a partially assembled mold according to a preferred embodiment of the invention.
Figure 2:
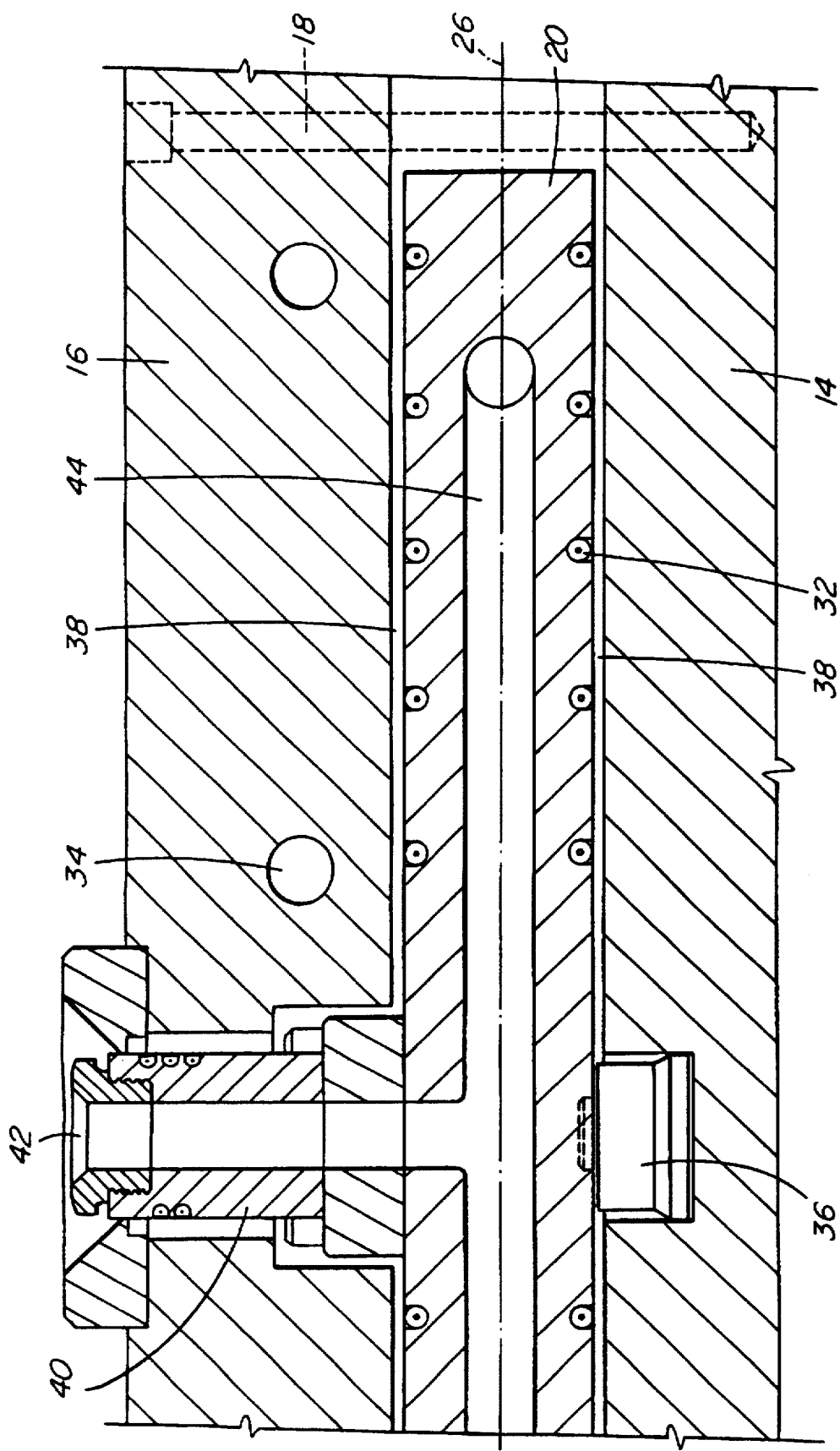
FIG. 2 is a sectional view along line 2—2 in FIG. 1 after assembly of the mold has been completed.
Figure 3:
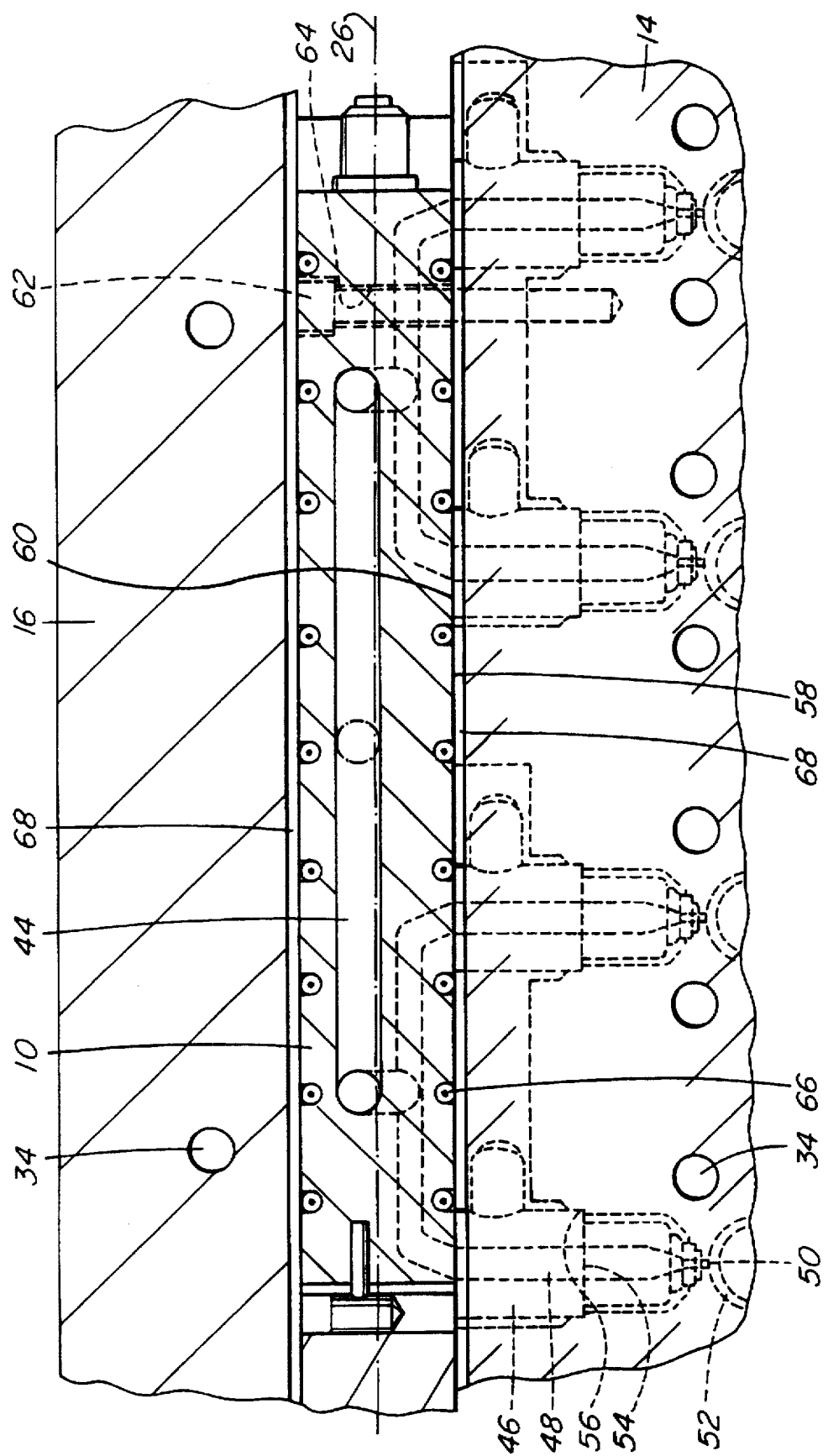
FIG. 3 is a sectional view along line 3—3 in FIG. 1 after assembly of the mold has been completed.

Reference is first made to FIGS. 1, 2 and 3 which show four heated nozzle manifolds 10 mounted in a mold 12.

While the mold 12 usually has a greater number of plates and inserts depending upon the application, in this case only a manifold retainer plate 14 and a back plate 16 which are secured together by bolts 18 are shown for ease of illustration. In other embodiments, a hydraulic plate with valve members and actuating mechanism can be used to provide a valve gated system rather than a sprue gated system.

An elongated heated central or main manifold 20 having two arms 22 extending in opposite directions is also mounted in the mold 12. The central manifold 20 has a longitudinal axis 24 extending in a first direction. As best seen in FIG. 1, each arm 22 of the central manifold 20 extends between a pair of the nozzle manifolds 10. The four nozzle manifolds 10 and the central manifold 20 all extend in a common plane 26 and each nozzle manifold 10 is connected to the central manifold 20 by an elongated connector bushing 30 extending in a second direction substantially perpendicular to the first direction.

The central manifold 20 is heated by an integral electrical heating element 32 and the mold 12 is cooled by pumping cooling water through cooling conduits 34. As seen in FIG. 2, the heated central manifold 20 is centrally located by a central locating ring 36 seated between it and the mold 12 and has an insulative air space 38 extending between it and the surrounding cooled mold 12. The central manifold 20 also has a central manifold extension or inlet bushing 40 which extends rearwardly through the back plate 16 to the central inlet 42. A melt passage 44 extends from the central inlet 42, branches in opposite directions into the arms 22 of the central manifold 20, and then branches again in opposite directions to extend through each connector bushing 30 into the respective four nozzle manifolds 20.

While nozzle manifolds and the melt passage through them can have various configurations, in this case the melt passage 44 branches in each nozzle manifold 10 to extend to eight individual spaced heated nozzles 46. As best seen in FIG. 3, the melt passage 44 continues through a central melt bore 48 through each nozzle 46 to a gate 50 leading to a cavity 52. The arrangement of the various manifolds and the configuration of the melt passage 44 through them ensures that the length of melt flow to each gate 50 in the system is exactly the same. Each nozzle 46 is located with the central melt bore 48 aligned with the gate 50 by a circumferential locating bushing 54 seated in a circular seat 56 in the manifold retainer plate 14. The front face 58 of each nozzle manifold 10 abuts against the rear ends 60 of the nozzles 46 and is secured in this position by screws 62 extending into the manifold retainer plate 14. The screws 62 extend through holes 64 in each nozzle manifold 10 that are enough larger than the screws 62 to let the nozzle manifold 10 move sufficiently to allow for thermal expansion and contraction as described in more detail below. The nozzle manifolds 10 are also heated by an integral electrical heating element 66 and are thus mounted with insulative air spaces 68 extending between them and the surrounding cooled mold 12.

Figure 4:
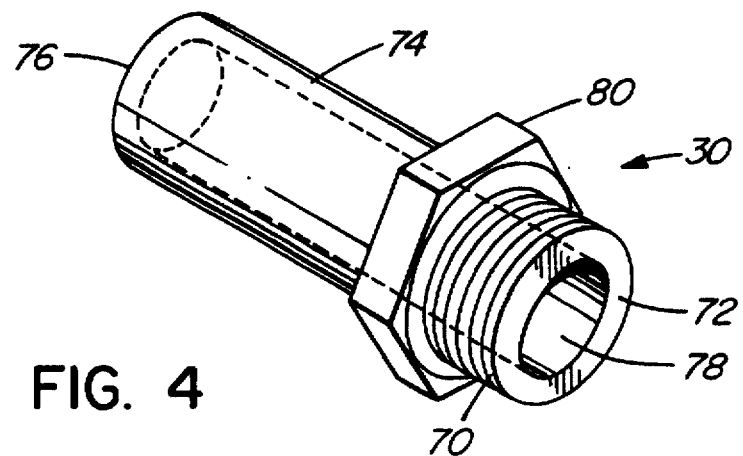
FIG. 4 is an isometric view of a melt connector bushing seen in FIG. 1.

Referring also to FIG. 4, each connector bushing 30 has a threaded cylindrical portion 70 at one end 72 and a nonthreaded cylindrical portion 74 at the other end 76. The connector bushing 30 also has a central bore 78 and a hexagonal flange 80 which facilitates it being tightened into place and easily removed. In this embodiment, as seen in FIG. 1, each connector bushing 30 is mounted with the threaded portion 70 screwed into a threaded opening 82 in one arm of the central manifold 20 and the nonthreaded portion 74 slidably received in a matching nonthreaded cylindrical opening 84 in one of the nozzle manifolds 10. In other embodiments, the direction can be reversed or the connector bushing 30 can have nonthreaded portions 74 at both ends, in which case the opening 82 in one arm of the central manifold 20 would also be nonthreaded.

The nonthreaded portions 74 of the connector bushings 30 are made to fit tightly enough in the openings 84 in the nozzle manifolds 10 to prevent melt leakage, but still able to slide sufficiently in the openings 84 to allow for thermal expansion and contraction. In a preferred embodiment, the manifolds 10, 20 are made of a material such as steel having a relatively low coefficient of thermal expansion and the connector bushings 30 are made of a material such as beryllium copper alloy having a relatively greater coefficient of expansion. In this way the connector bushings 30 can easily be installed and then expand into a tighter fit when they are heated to the operating temperature and exposed to high pressure. In other embodiments they can all be made of the same material and preloaded.

Figure 5:
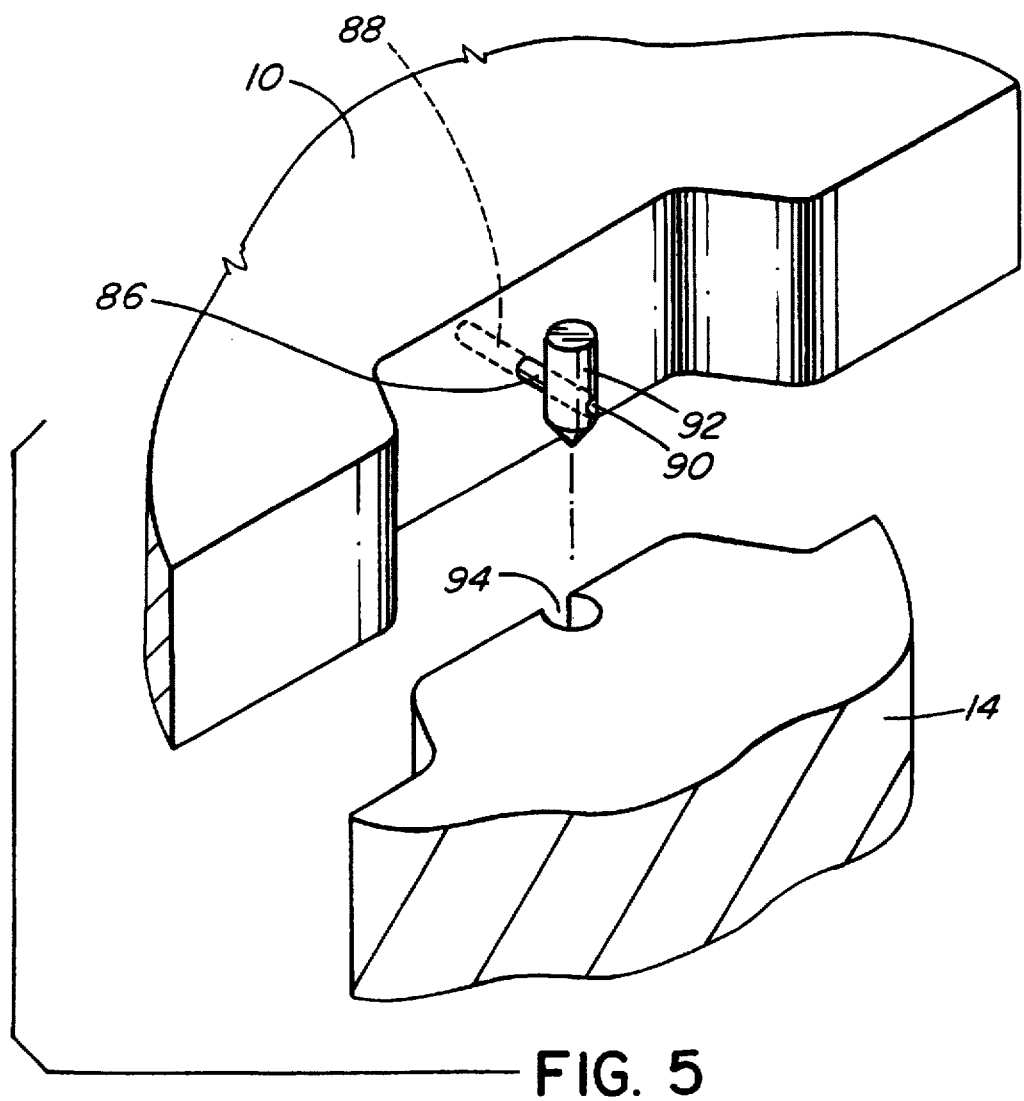
FIG. 5 is an isometric view showing a nozzle manifold with a locating pin and cam in position to be received in a matching channel in the mold.

Referring now to FIGS. 1 and 5, it can be seen that each nozzle manifold 10 is also located by an elongated locating pin 86 which extends from a hole 88 in the nozzle manifold 10 into a hole 90 in a cam 92 which is received in a channel 94 in the manifold retainer plate 14. As seen in FIG. 1, the locating pin 86 extends in the first direction parallel to the longitudinal axis 24 of the central manifold 20 and, in this embodiment, is preferably aligned with the center 96 of the nozzle manifold 10.

In use, after assembly as shown, cooling water is pumped through the cooling conduits 34 and electrical power is applied to the heating elements 32, 66 to heat the manifolds 10, 20 and the connector bushings 30 to the operating temperature. As the manifolds 10, 20 are heated, thermal expansion causes each nozzle manifold 10 to slide across the rear ends 60 of the nozzles 46 which are fixed in place relative to the mold. The amount of this movement at each nozzle 46 must be precalculated and the nozzle manifolds 10 must be made with each branch of the melt passage 44 dimensioned to slide into exact alignment with the melt bore 48 of one of the nozzles 46 as the operating temperature is reached. It will be appreciated that injection melt pressures up to 20,000 psi. and injection melt temperatures up to 300° C. make alignment both very difficult and yet critical to achieve. Improper alignment creates stress in the melt and results in unacceptable quality control.

The locating pin 86 allows each nozzle manifold 10 to move in the first direction, but prevents it moving in the second direction substantially perpendicular to the first direction. The amount of movement in the first direction of the nozzle manifold 10 at the specific location of each nozzle 46 is a combination of the expansion of the central manifold 20 and of the nozzle manifold 10 from which it extends and therefore depends upon the distance of each particular nozzle 46 from the central locating ring 36. Since this distance is known along with coefficient of expansion of the manifolds 10, 20, the amount of movement of the nozzle manifold 10 in the first direction at each specific nozzle 46 can be calculated, and the nozzle manifold 10 is made so that the melt passage 44 will align with the melt bore 48 at the operating temperature.

As the central manifold 20 and each nozzle manifold 10 are heated they also expand towards each other in the second direction. However, the nonthreaded portion 74 of the connector bushing 30 extending to each nozzle manifold 10 slides in the cylindrical opening 84 in the nozzle manifold 10 to absorb or compensate for this expansion of the nozzle manifold 10 and the central manifold 20 towards each other in the second direction. Thus, the connector bushing 30 absorbs the thermal expansion in the second direction so the locating pin 86 can be used to locate the nozzle manifold 10 in the second direction but allow it to slide in the first direction.

The amount of movement in the second direction of the nozzle manifold 10 at each nozzle 46 depends upon the distance that nozzle 46 is offset from the locating pin 86. Since this distance is known along with the coefficient of expansion of the nozzle manifold 10, the amount of movement of the nozzle manifold in the second direction at each specific nozzle 46 can be calculated, and the nozzle manifold is made so that the melt passage 44 will align with the melt bore 48 at the operating temperature.

Thus, the combination of the connector bushing 30 and the locating pin 86 allow sufficient movement of the nozzle manifold 10 in both the first and second directions to provide for thermal expansion of the heated manifolds 10, 20 relative to the cooled mold 12. Of course, this movement is reversed if the heating elements 32, 66 are turned off and the manifolds 10, 20 cool off for disassembly or repair. While locating pins 86 and cams 92 are shown, in other embodiments other locating means can be used which locate the nozzle manifolds 10 in the second direction, but allow them to slide freely in the first direction.

After the manifolds 10, 20 have expanded into place with each branch of the melt passage 44 aligned with the melt bore 48 through one of the nozzles 46, pressurized melt is applied from a molding machine (not shown) to the central inlet 42 of the melt passage 44 according to a predetermined cycle. The melt flows through the melt passage 44 in the manifolds 10, 20 to the aligned central melt bore 48 in each nozzle 46 and then through the gates 50 into the cavities 52. After the cavities 52 are filled and a suitable packing and cooling period has expired, the injection pressure is released and the melt conveying system is decompressed to avoid stringing through the open gates 50. The mold 12 is then opened to eject the molded products. After ejection, the mold 12 is closed and the cycle is repeated continuously with a cycle time dependent upon the size of wall section of the molded part and the type of material being molded.

While the description of the injection molding apparatus has been given with respect to a preferred embodiment, it will be evident that various other modifications are possible without departing from the scope of the invention as understood by those skilled in the art and as defined in the following claims.

The embodiments of the invention in which an exclusive property or privilege is claimed is defined as follows:

1. In an injection molding apparatus with a heated central manifold and a plurality of heated nozzle manifolds mounted in a mold having a melt passage branching in the central manifold for conveying melt from a central inlet in the central manifold through the nozzle manifolds to a plurality of heated nozzles extending from each nozzle manifold, each nozzle seated in the mold with a central melt bore extending in alignment with a gate leading to a cavity, the improvement wherein;

the central manifold and four nozzle manifolds extend in a common plane, the central manifold is centrally located relative to the four nozzle manifolds and has two elongated arms extending in substantially opposite directions along a longitudinal axis, each arm having two opposed sides, a pair of said nozzle manifolds are mounted on opposite sides of each arm of the central manifold, whereby each nozzle manifold is offset from the central manifold in a second direction that is substantially perpendicular to the longitudinal axis of the central manifold, an elongated connector bushing extends outward from each side of each arm of the central manifold to slidably connect one of the nozzle manifolds to the central manifold, a slidable locating device extends between the mold and each nozzle manifold, and the melt passage branches in opposite directions in each arm of the central manifold to extend through each of the connector bushing and branches again in each nozzle manifold to extend to the melt bore through each of the nozzles, said connector bushing locates said one nozzle manifold relative to the central manifold in a first direction along the longitudinal axis while allowing movement to compensate for thermal expansion and contraction of said one nozzle manifold and the central manifold in said second direction substantially perpendicular to the first direction, said slidable locating device locates said each nozzle manifold relative to the mold in said second direction while allowing movement of said each nozzle manifold relative to said mold in said first direction, whereby the combination of said connector bushing and said slidable locating means allows sufficient movement in both the first and second directions to provide for thermal expansion and contraction of the heated manifolds relative to the cooled mold, each nozzle manifold being made and mounted so thermal expansion within the central manifold, connector bushings and nozzle manifolds slides the branches of the melt passage into alignment with the melt bores through the nozzles when the manifolds and connector bushings are heated to an operating temperature.

2. Injection molding apparatus as claimed in claim 1 wherein each connector bushing has at least one nonthreaded cylindrical portion extending from one end and a melt bore extending centrally therethrough from said one end to the other end, the at least one nonthreaded portion of the connector bushing being received in a nonthreaded cylindrical opening aligned with the melt passage in one of said each nozzle manifold and the central manifold, the nonthreaded portion of the connector bushing fitting in said nonthreaded cylindrical opening to allow the nonthreaded portion of the connector bushing to slide sufficiently in said nonthreaded cylindrical opening without allowing leakage of pressurized melt flowing through the melt passage.

3. Injection molding apparatus as claimed in claim 1 wherein each connector bushing has a threaded cylindrical portion extending from one end, a nonthreaded cylindrical portion extending from the other end, and a melt bore extending centrally therethrough from said one end to said other end, the threaded portion being removably secured in a threaded cylindrical opening aligned with the melt passage in one of said each nozzle manifolds and the central manifold, the nonthreaded portion of the connector bushing being received in a nonthreaded cylindrical opening aligned with the melt passage in the other of said each nozzle manifold and the central manifold, the nonthreaded portion of the connector bushing fitting in said nonthreaded cylindrical opening to allow the nonthreaded portion of the connector bushing to slide sufficiently in said nonthreaded cylindrical opening without allowing leakage of pressurized melt flowing through the melt passage.

4. Injection molding apparatus as claimed in claim 3 wherein each locating device has an elongated locating member extending in the first direction, the elongated locating member being slidable with respect to at least one of the mold and said each nozzle manifold.

5. Injection molding apparatus as claimed in claim 4 wherein the locating member extends in alignment with the center of said each nozzle manifold.

6. Injection molding apparatus as claimed in claim 5 wherein the locating member is a locating pin.

* * * * *